Aug. 4, 1942. T. A. BOWERS 2,291,945
PISTON RING CONSTRUCTION
Filed April 1, 1940 2 Sheets-Sheet 1
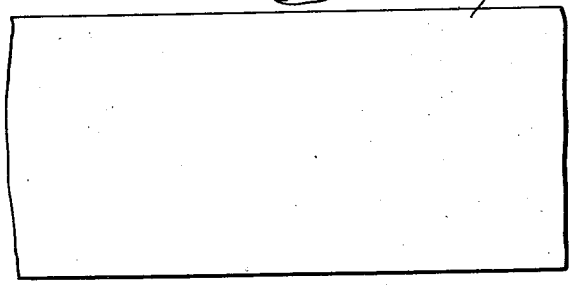
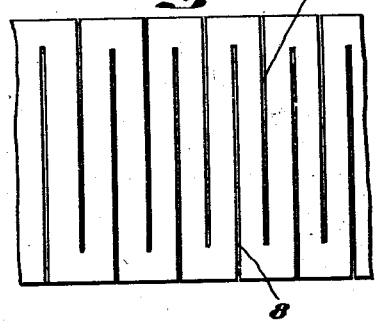
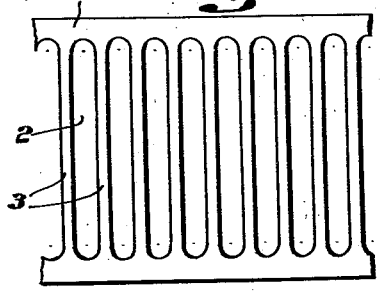
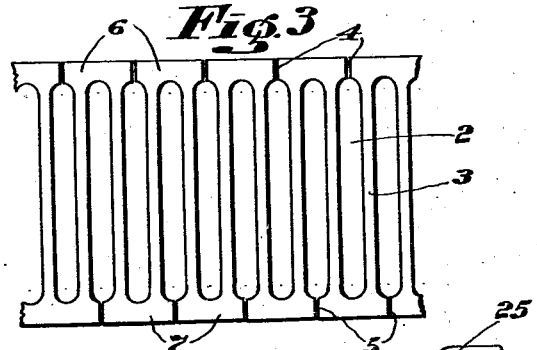
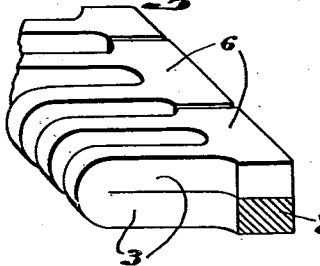
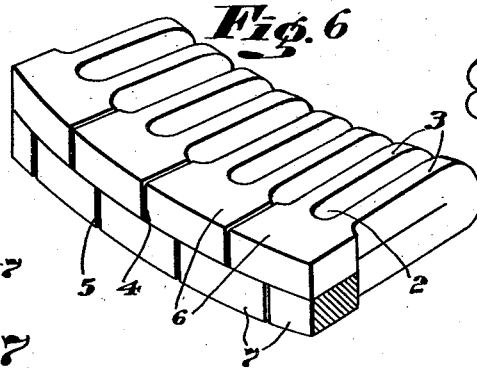
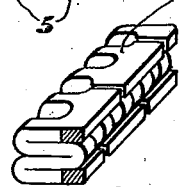
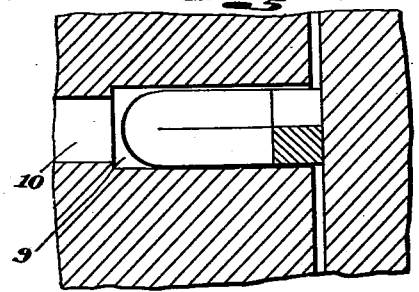
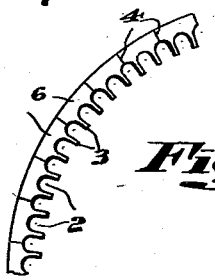
INVENTOR
Thomas A. Bowers
BY
ATTORNEY Aug. 4, 1942.  T. A. BOWERS  2,291,945
PISTON RING CONSTRUCTION
Filed April 1, 1940   2 Sheets-Sheet 2
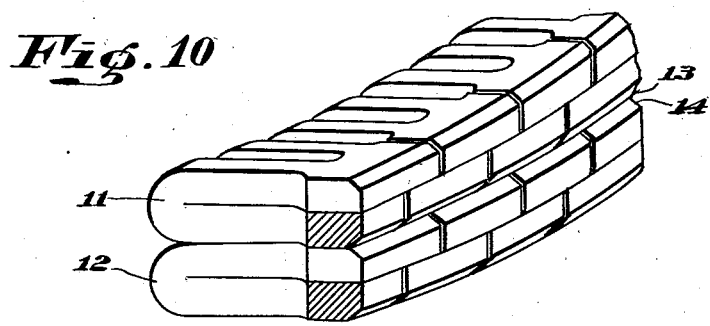
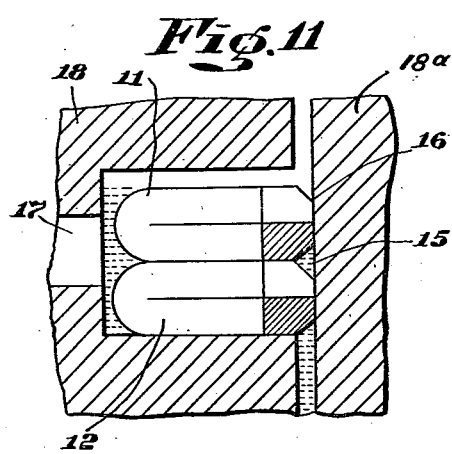
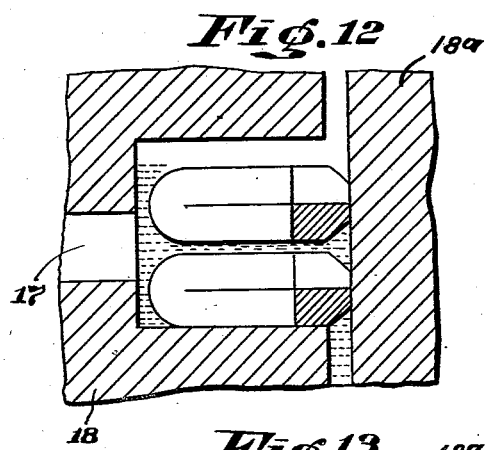
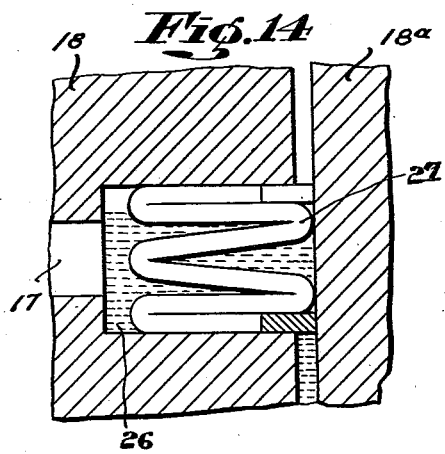
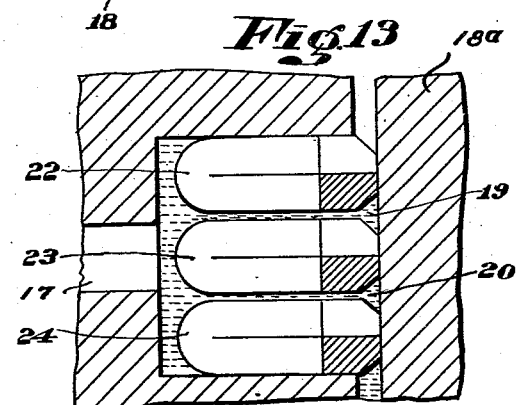

Patented Aug. 4, 1942

2,291,945

UNITED STATES PATENT OFFICE 2,291,945

PISTON RING CONSTRUCTION

Thomas A. Bowers, Boston, Mass., assignor to Power Research Corporation, Boston, Mass., a corporation of Massachusetts Application April 1, 1940, Serial No. 327,279

1 Claim. (Cl. 309—44)

This invention relates to piston rings and is a continuation in part of my co-pending application Serial No. 326,338 now Patent No. 2,224,338.

It is an object of the invention to improve piston rings and, further, to devise, especially from sheet materials, novel composite structures generally adapted to constitute piston rings and in particular oil control piston rings. Further objects of the invention are the provision of flexible ring structures having novel portions and surfaces which may be applicable to various types of piston rings; to impart, in novel fashion, extensibility and compressibility to sheet metal rings; and to indicate generally sheet material ring constructions which may be manufactured with conventional tool machinery such as punches, dies, and the like, whereby the expense of designing and making special machinery is avoided and the cost of manufacture of piston rings reduced. The invention also aims to furnish a simple unitary and efficient oil control ring which presents desirable oil passageways and resists formation of carbon.

Attainment of these and other objects of the invention will appear in the following description of the drawings and discussion relating thereto.

In the accompanying drawings:

Fig. 1 is a plan view illustrating a sheet material made use of in the invention to form piston rings.

Fig. 2 is a plan view of the sheet material, illustrating a step of effecting ring-forming portions therein.

Fig. 3 is a plan view of the material illustrating still another forming step.

Fig. 4 is a plan view of material in which a modification of forming operation is indicated.

Fig. 5 is a fragmentary perspective view of the material shown in Fig. 3 folded upon itself to form a piston ring.

Fig. 6 is a perspective view fragmentarily illustrating the finished ring as viewed from the outside thereof.

Fig. 7 is a cross section of the finished ring indicated in Figs. 5 and 6, assembled in a piston groove.

Fig. 8 is a fragmentary plan view of the ring.

Fig. 9 is a fragmentary perspective view, partly in section, of a ring modification of the type of ring indicated in Figs. 1-4 inclusive.

Fig. 10 is a fragmentary perspective view, partly in section, illustrating a ring assembly modification made up of ring sections similar to those indicated in Figs. 5-8 inclusive.

Fig. 11 is a cross section of a ring assembly similar to that shown in Fig. 10 mounted in a piston groove.

Fig. 12 is a view similar to Fig. 11 illustrating a position assumed in operation by the ring assembly.

Fig. 13 is a view similar to Figs. 11 and 12 illustrating a further modification of a ring assembly; and Fig. 14 is a cross section of still another modification of ring formed from sheet material.

Referring in detail to the drawings, there have been illustrated a number of sheet metal constructions which are directed to improvements in piston rings generally and in particular to oil metering piston rings.

Having reference to the construction included in Figs. 1-14 inclusive, numeral 1 denotes a length of sheet material employed in constructing the rings of the invention. The sheet material is of a resilient character and may consist of a spring steel, alloy, or other metal or suitable substance. According to the invention, a strip or sheet of the resilient material is formed to provide ring-forming portions and the material is folded in relation to the said portions to provide ring surfaces. As illustrated in Figs. 2 and 3, the strip 1 is punched to provide openings 2 occurring transversely within the strip and to form web portions 3. The strip is also formed with slits or cuts 4 and 5 occurring along edges thereof and alternately connecting with the openings 2 to effect segments or crown portions 6 and 7. The formed material is folded upon itself longitudinally of the strip as illustrated in Fig. 5. This provides a straight length of material which is then given a circular or annular form as illustrated in Figs. 6 and 8. A length of the material suitable for effecting a piston ring of a desired size is cut off from the strip and various grinding or other conventional finishing operations may be resorted to, to provide a completed ring well suited to constituting an oil metering member.

The operations described in connection with treating the sheet material may be effected by apparatus commonly referred to as "tool machinery." For example, the punching of opening 2 may readily be effected with conventional punch press mechanism. Similarly, the cutting of slits or openings 4 and 5 can be effected by conventional cutting or shearing dies, and folding of the material achieved with the aid of conventional press mechanism or rolling means. Forming a straight length of folded material into a circular body can be effected in several ways, one example of which is to force a length of the material through an annular channel or die.

In the construction indicated there is provided an annular supporting structure made up of the web portions 3 doubled over upon themselves with their points of folding constituting the inner periphery of the supporting structure. In the folded position of the sheet material, the openings 2 extend radially of the ring and provide for the doubled-over webs 3 being spaced apart in circumferentially compressible relation to one another.

Received at the outer side of the supporting structure, and constituting an outer periphery therefor, are upper and lower circumferential surfaces made up of the segments or crowns 6 and 7, each crown being supported by two of the webs and extending beyond the webs. The segments or crowns are disposed in contiguous relation to one another and form upper and lower layers of the sheet material. The cuts or openings 4 and 5, in the folded position of the strip, extend radially inward and provide for adjacent segments in each of the above mentioned layers being spaced apart in compressible relation to one another.

The openings 4 of the top circumferential surface occur in staggered relation with respect to the openings 5 of the bottom circumferential surface indicated, and each opening is sealed, relative to flow of fluids vertically of the ring, by its overlying segment. Also, the openings 4 and 5 connect with openings 2 to form passages extending radially of the ring.

In the construction of a piston ring it is usually necessary to provide at the top and bottom of the ring "land surfaces," also referred to as "seating surfaces" or "sealing surfaces," which ordinarily extend throughout the radial width of the ring. Such surfaces allow a ring to properly "seat" or "seal" in its groove during reciprocation of the piston and thereby prevent flow of fluids by the ring.

A feature of the ring structure formed by the above indicated procedures is the provision of novel "land surfaces" or "sealing surfaces" which provide for satisfactory seating or sealing of a ring in its groove and effect other advantages. In the ring of the invention, such surfaces are comprised by a plurality of ring-forming portions as embodied by the segments 6 and 7. It has been found that by arranging the segments in contiguous relation to one another, they may comprise substantially continous circumferential areas well adapted to constituting seating or sealing surfaces for the ring. It also is found that the size of the segments may be such that they constitute only a part of the radial width of the ring, thus allowing the seating or sealing surfaces to occur at one side of a supporting structure or at other points.

Such a sealing surface makes possible the construction of a light, efficient ring, which at its supporting or web portions may be of an open construction highly adapted to facilitating passage of oil therethrough and comprising an oil metering member.

The relatively smaller sealing surface of the ring effected by the ring-forming portions or segments presents a further advantage by reason of the fact that there is reduction in extrusion of oil on to a cylinder wall such as occurs when an oil ring slaps in its piston groove. This is so for the reason that less oil can collect at the top and bottom sides of the ring at any one time.

Another feature of the ring structure under consideration consists in its novel circumferentially extensible and contractible character and the manner in which this character is imparted to the ring. The flexibility is effected by providing cuts or openings arranged in overlapping relation whereby intervening sections or portions of the cut material may be bent or flexed upon one another. By this means there is effected an extensible and compressible element, which may be formed into an annular body of circumferentially extensible and contractible character. In developing extensibility in this way in an annular body, a preferable result may be obtained by making those cuts or openings which are to occur at the inner periphery of the body larger than openings which are to occur at the outer periphery of the body, as for example has been done with respect to openings 2 on the one hand and 4 and 5 on the other. This improves the range of extensibility which is effected and benefits the operation of the structure as a piston ring.

It will be observed that the ring construction described presents relatively thin peripheral edges which are well suited to act as oil metering portions and to approximate the thin edges of separate steel rings heretofore used. From the relatively small bearing surface of the ring, and its highly developed circumferentially extensible and contractible character described, a very desirable range of wall pressure may be obtained which particularly suits the ring to use with worn cylinders without there developing greatly increased cylinder wear.

Still another feature of the invention consists in a ring construction not substantially affected by the formation of carbon. It is pointed out that in substantially all oil rings, special passages are provided to pass oil to the crankcase. Such openings of any appreciable size, occurring in a ring body, tend to become clogged with carbon and fail. Carbonization occurs in two ways: first, in the form of a thick soft body which develops rather quickly, and second, in a hard scaly form which is found after long periods of ring operation. The ring of this invention provides no relatively large oil passageways in which carbon can form and is sufficiently thin that it may depend upon passing oil over and under itself and through its interstices to operate efficiently.

In operation the ring functions as a gapless ring with its ends adapted to abut one another. By its circumferential extensibility, the ring completely engages the wall of a cylinder, and exerting a substantially uniform pressure at all points therealong. It should be noted that the extensible character of the ring is attained without its inner periphery being connected with the piston as occurs in the use of expander members disposed between the back of a ring and its ring groove. As a result there is less transfer of piston slap, and a reduction of the wear ordinarily developing from such piston slap.

With reference to specific operation of the ring structure as an oil metering member, it is pointed out that the segments 6 and 7 are contiguously arranged to constitute substantially continuous circumferential surfaces by which the ring may form a satisfactory seal against a top or bottom side of a piston groove for preventing passage of oil thereby. The thickness of the sheet metal may be varied to provide any desired thickness in the oil scraping edges. The relatively large openings 2 extending well out toward the segments 6 and 7, facilitate the passage of oil collected by the segments into the ring groove, from which it passes into the crankcase.

Various advantages are present in connection with the piston ring construction illustrated in Figs. 1–8 inclusive. There is provided a one-piece ring which is adapted to be easily handled and assembled about a piston. The ring construction is provided with a novel extensible and compressible character, rendering it particularly adapted to conforming to worn or irregular cylinder surfaces. The nature of the ring is such as to provide thin oil scraping edges of a character closely simulating the thin edges of separate C-type rings heretofore employed. The entire structure is adapted to be formed of a tough thin material such as steel, of which only relatively small amounts are required, which results in a light, durable ring. In addition, materials of the character indicated, and the composite construction developed in connection therewith, are highly adapted to cheap manufacturing processes which make use of conventional "tool" machinery such as punches, forming and shearing dies, and press and rolling mechanism whereby relatively smaller amounts of money are required to be invested in "tooling up" to make the rings, and relatively smaller investments are required to be maintained at any one time. The ring construction shown has a relatively large range of expansibility and may provide almost any desired wall pressure. The ring is further characterized by efficient oil metering and substantial reduction of cylinder wear.

While the particular forming steps illustrated have been shown in connection with a length or strip of material, it is intended that such operations may be effected upon materials occurring in varying forms as in sheet form or in a web or roll. Varying thicknesses of material may also be utilized as by having one part of a strip thicker than another part, or by using a plurality of strips or sheets. The cutting or forming operations may be modified as for instance in the manner indicated in Fig. 4, in which alternately disposed slits or cuts 8 are employed in place of the openings shown in Figs. 2 and 3. Still other changes in the arrangement of the openings or cuts may be resorted to, as for example, openings may be disposed diagonally or angularly of a strip of the material or in other non-uniform ways. Also, the cutting or forming operations may be carried out at other stages in the method of making the ring, as for instance after a sheet or strip of piston ring material has been folded or formed into either an intermediate or permanent position, or at some other point. It may further be desired, in accordance with the invention, to utilize the cutting or forming operations to provide ring-forming pieces which have been cut off from a strip or sheet and which may be separately brought together piece by piece on some form of annular supporting structure. Any one or all of the operations described may be utilized in making rings other than the oil control type referred to, as for example compression rings or expander rings or other special types of sealing members. The longitudinally folded strip construction may be used to form a ring of the conventional C-type either with or without openings or cuts being provided in the material, and the layers of material resulting from longitudinally folding a strip may be arranged to occur at the inner and outer side of a ring as effected by disposing a length of the folded material in a position at right angles to the position assumed in Figs. 5 and 6.

A development in oil control ring construction is a ring assembly made up of a plurality of thin C-type rings mounted one upon another and provided with an expander member engaged at the inner sides of each of the rings. Such a construction has been found to function due to a hydraulic pressure set up at the outer periphery thereof when the ring assembly reciprocates against the wall of a cylinder and collects oil between its sections. The hydraulic pressure opens the rings up upon one another and thereby provides passageways for the oil to move inwardly of the ring. A general objection to such rings is that they require a relatively strong expander, which undesirably wears the cylinder wall. Also, in order that the hydraulic pressure may be effective in spacing the rings apart, it must first overcome the friction of the rings on the expander member and a part of its value is lost thereby.

In accordance with the present invention, there is provided a ring assembly as illustrated in Figs. 10–14, in which the desirable hydraulic pressure of the conventional ring above described is retained and the objections present from the use of an expander are eliminated. In addition, further improved function is obtained by modification of the structure.

The assembly referred to consists of two ring sections denoted by the numerals 11 and 12, disposed loosely upon one another. These ring sections constitute circumferentially extensible and compressible annular bodies of the same general character as the rings described in Figs. 1–8 inclusive. However, they may be modified to provide beveled edges 13 and 14 occurring circumferentially of the rings which when located one above another and against a cylinder wall 18a comprise oil chambers 15 as illustrated in Fig. 11. The action of the chambers 15 is to retain oil collected by the edges of the ring sections until a pressure is built up therein, at which time the ring sections are forced apart to form openings for oil to move radially inward of the ring and thence out through oil passages 17 in the piston 18, as has been more clearly indicated in Fig. 12. This type of ring assembly may be composed of any desired number of ring sections to effect a plurality of hydraulic pockets or chambers, as for example chambers 19 and 20 effected from the assembly of three ring sections 22, 23 and 24, as illustrated in Fig. 13, or other combinations.

It is pointed out that the present assembly, while functioning in the same manner as the "hydraulic" rings above referred to, is an improvement thereupon by reason of there being no separate expander member present; also by reason of the fact that there are radial interstices extending between the inner and outer peripheries of each ring section. In use, the ring assembly has the advantage of being very easily mounted in a piston, and elimination of the expander member allows the ring sections to be more easily and more quickly forced apart by oil pressure during reciprocation against the wall of a cylinder.

In Fig. 9, a modified type of piston ring has been indicated, which is particularly illustrative of modification in the folded ring construction illustrated in Figs. 5 and 6. A strip of the sheet metal, formed in the manner illustrated in Figs. 2 and 3, is folded longitudinally as before, but in this instance reversely upon itself to form an increased number of layers of material, piled one upon another to make up the ring 25 as illustrated. Several changes are effected in the character of the ring by this modified folded construction. The height of the ring is increased, the number of interstices and the cross sectional area thereof become greater, the wall pressure of the ring is modified, the length of the connecting web portions is increased, and other advantageous results are obtained.

A further example of sheet metal reversely folded longitudinally of itself is illustrated in Fig. 14, in which is shown in a piston groove 26 a ring 27 made up of reversely folded material in which two of the layers of material are only partially closed upon one another. By this construction, there is effected vertical resiliency or "take up" in the ring, enabling it to engage with opposite sides of a piston groove as shown in Fig. 14, and thereby eliminate slapping of the ring in the groove.

It will be observed that there have been disclosed and described ring members broadly illustrative of composite structures made up of separate ring-forming portions as particularly exemplified by formed sheet metal or other materials. It is pointed out that a novel combination of cutting operations and folding operations has been resorted to, to produce novel ring constructions, ring surfaces, and ring functions, and that each of the several forming and assembling procedures are subject to modification in various directions, and for various purposes, and are applicable in connection with making any type of piston ring. The improvements disclosed provide novel, cheap, light, efficient, and durable ring structures, constituting a substantial departure from the art. It is pointed out that there is made available a piston ring construction highly adapted to being manufactured from tool machinery at greatly reduced cost, tending to lower the cost of manufacture of piston rings generally. Several advantageous features have been embodied in a unitary construction and undesirable factors have been reduced to a minimum, particularly in connection with oil-metering piston rings.

While I have shown preferred embodiments of the invention, it should be understood that various changes and modifications may be resorted to in connection therewith, in keeping with the spirit of the invention as defined by the appended claim.

Having described my invention, I claim:

A piston ring comprising a plurality of segments of piston ring material arranged in annular rows which are closely compacted one upon another throughout their radial width, resilient connecting webs for connecting the segments of one row to segments of the other row along the inner periphery of the ring, the points of separation of the segments in one row occurring in staggered relation with respect to points of separation of segments of the other row, said connecting webs being completely bent over upon themselves and presenting doubled-over portions which extend throughout a substantial part of the radial width of the ring and which are circumferentially spaced apart from one another, and said segments being of a radial width less than that of the ring.

THOMAS A. BOWERS.